United States Patent [19]

Gustafson et al.

[11] Patent Number: 5,216,922
[45] Date of Patent: Jun. 8, 1993

[54] SLOPE MONITORING DEVICE

[75] Inventors: Eric S. Gustafson; Jonathan P. Olson; Lyle V. Johnson; Lee J. Smith, all of Tucson, Ariz.

[73] Assignee: Modular Mining Systems, Inc., Tucson, Ariz.

[21] Appl. No.: 803,284

[22] Filed: Dec. 4, 1991

[51] Int. Cl.$^5$ ............................................. G01B 5/30
[52] U.S. Cl. .................................... 73/784; 33/1 H
[58] Field of Search ............. 73/784, 84; 33/1 H, 33/1 HH, 718, 624; 242/148

[56] References Cited

U.S. PATENT DOCUMENTS 4,305,299 12/1981 Serata ............................... 73/784 X
4,364,034 12/1982 Bellatty et al. ................... 33/1 H X Primary Examiner—Jerry W. Myracle
Attorney, Agent, or Firm—Cahill, Sutton & Thomas

[57] ABSTRACT

A slope monitoring device includes a cable anchored at one end to the sloped wall of an open pit mine, dump, or the like. The cable extends over an idler pulley at the top of the sloped wall and passes around a further pulley coupled to an optical shaft encoder which generates a digital signal corresponding to the angular position of the pulley. The cable is engaged by a clutch and is wound about a play-off reel, each secured to a weighted sleeve slidingly extending about a vertical post. The weighted sleeve maintains tension upon the cable, while the clutch allows additional cable to be played off of the reel when tension is increased due to movement of the wall. The shaft encoder information, along with the temperature, battery condition, and cable condition, are transmitted by radio to a remote location for processing.

18 Claims, 2 Drawing Sheets

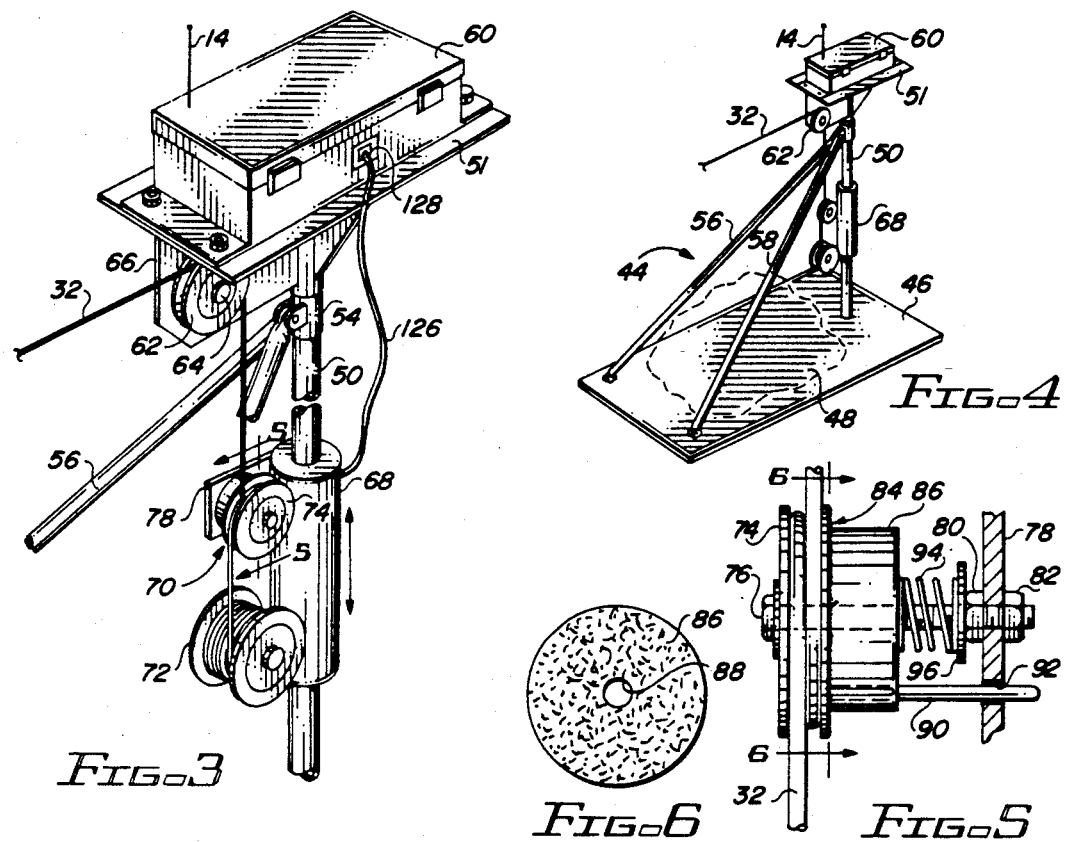
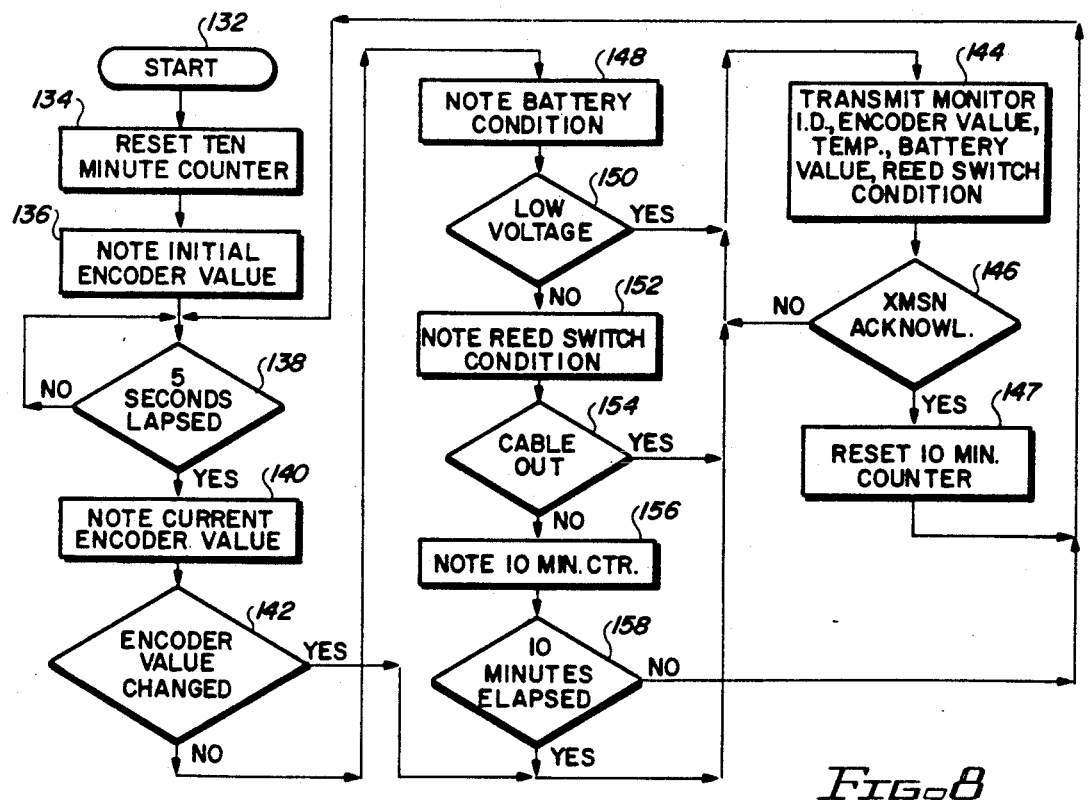

SLOPE MONITORING DEVICE

BACKGROUND OF THE INVENTION

1. Field of the Invention

The present invention relates generally to wire line extensometers of the type used to measure movement of a sloped wall in an open pit mine, dump, or the like, and more particularly to a slope monitoring device adapted to operate for extended periods of time without manual intervention.

2. Description of the Prior Art

Within the field of open pit mining, the use of wire line extensometers is well known for detecting and monitoring movement of sloped walls of open pit mines or dumps in advance of the collapse of the wall. Such wire line extensometers typically include a cable anchored at one end to the sloped wall and secured at the opposing end to a pointer and a free-hanging counterweight. Periodically, a mine employee must drive to the site of the extensometer, visually observe the status of the pointer, record the result, and compare the result to the reading observed on the prior day in order to detect any shift in the sloped wall. The need for the mine employee to periodically visit the site of the extensometer to record such measurements is a nuisance, particularly since there may be several extensometers scattered throughout the mine, each of which must be regularly visited.

Further, wire line extensometers that are presently used in open pit mining operations must be manually reset frequently in order to keep the pointer within the range of the measuring scale. Continued movement of the sloped wall ultimately pulls the pointer off the scale. In such instances, the mine employee must reset the pointer, as by lengthening the cable, in order to move the pointer back onto the measuring scale.

Wire line extensometers that are presently used today are typically observed once per day or more often. While movement of a sloped wall is usually a very slow process, the rate of wall movement often accelerates prior to a collapse. Unfortunately, it is difficult to detect such accelerated movement when observations are made only once per day.

Changes in wire line extensometer measurements may sometimes be caused by changes in temperature rather than by significant movement of the sloped wall. Such wire line extensometers typically use a steel cable which tends to expand or contract depending upon the ambient temperature. Those wire line extensometers currently in use are unable to distinguish between measurement changes due to actual wall movement as compared with measurement changes due to varying ambient temperature.

Wire line extensometers must often be moved from one point to another in an open pit mining operation. Moreover, such devices must be of rugged construction to survive in a mining environment.

Accordingly, it is an object of the present invention to provide a slope monitoring device for detecting and measuring movement of a sloped wall in an open pit mine, dump, or the like, which slope monitoring device avoids the need for daily inspections by a mine employee at the site of such slope monitoring device.

It is another object of the present invention to provide such a slope monitoring device which can operate for extended periods without requiring a user to manually reset the device due to movement of the sloped wall.

It is still another object of the present invention to provide such a slope monitoring device which periodically and automatically provides status information regarding sloped wall movement to a remote location.

A further object of the present invention is to provide such a slope monitoring device responsive to ambient temperature conditions as might cause relative expansion or contraction of the extensometer cable.

A still further object of the present invention is to provide such a slope monitoring device which automatically signals the user when on-site maintenance is required.

Yet another object of the present invention is to provide such a slope monitoring device which is relatively inexpensive to manufacture, easily portable, simple to install, and rugged enough to withstand the open pit mining environment.

These and other objects of the present invention will become more apparent to those skilled in the art as the description of the present invention proceeds.

SUMMARY OF THE INVENTION

Briefly described, and in accordance with a preferred embodiment thereof, the present invention is directed to a slope monitoring device which includes a cable and an anchor for securing a first end of the cable to the sloped wall that is to be monitored. A cable movement detector is operatively engaged with the cable at a point located between the first and second ends of the cable for detecting movement of the cable. A clutch mechanism is engaged with the cable between the first and second ends of the cable and applies a frictional force to the cable for generally inhibiting free relative movement of the cable past the clutch mechanism. The clutch mechanism permits the length of the cable that extends between the first anchored end of the cable and the clutch mechanism to be increased as tension in the cable increases beyond a selected tensional force due to downward movement of the sloped wall.

Preferably, the slope monitoring device of the present invention includes a tensioning mechanism for maintaining tension on the cable at all times. The tensioning force applied to the cable is less than the selected tensional force required by the clutch mechanism to permit movement of the cable past the clutch mechanism. Ideally, the tensioning force is applied by securing the clutch mechanism to a carrier slidingly supported upon a vertical member, wherein the weight of the clutch mechanism and carrier apply a constant tensioning force to the cable. The second end of the cable may be wound about a reel also secured to the carrier for movement with the clutch mechanism. A stop is provided proximate the upper end of the vertical member to limit upward movement of the carrier. As tension in the cable is increased due to movement of the sloped wall, the clutch mechanism permits additional cable to be played off of the storage reel and passed through the clutch mechanism.

The mechanism for detecting movement of the cable includes a pulley which rotatably supports the cable, and further includes a mechanism for sensing angular rotation of such pulley in order to detect movement of the cable. Preferably, such a detection mechanism includes an electronic position encoder, such as an optical shaft encoder, coupled to such pulley and powered by a storage battery for generating an electrical signal representative of the angular position of such pulley. The slope monitoring device may include a radio for transmitting a digitally modulated radio signal to a remote location, such as a central control room, for communicating the angular position of the pulley, and hence, the relative position of the cable. Such information may be transmitted periodically throughout each day for advising a central computer and/or personnel within the control room of the current position of the cable and, hence, the status of the sloped wall being monitored.

Preferably, the cable detection mechanism periodically compares the current angular position of the pulley to a past angular position of the pulley; if the current angular position of the pulley differs from the past angular position of the pulley by a predetermined amount, the detection mechanism immediately causes the radio to transmit the current angular position of the pulley.

Apart from periodically transmitting information corresponding to the angular position of the pulley, the slope monitoring device may further include a sensor responsive to the ambient temperature for generating a corresponding electrical signal; this electrical signal may be transmitted, along with the angular position of the pulley, to the central control room for allowing adjustments to be made to the angular position information as may be due to expansion or contraction of the cable, by reason of changes in the ambient temperature.

The slope monitoring device may further include sensors for sensing the electrical voltage of the storage battery that provides power to the other components of the slope monitoring device. An electrical signal corresponding to such voltage is transmitted over the radio link to the central control room for alerting a mine operator of the need to replace or recharge the storage battery within the slope monitoring device.

The slope monitoring device may further include a sensor for detecting that the clutch mechanism has either become disengaged from the cable, or that the cable storage reel is empty. This sensor generates an electrical signal which may be transmitted over the radio link to the central control room for alerting the mine operator that on-site maintenance of the slope monitoring device is required. In one embodiment, such a sensor generates an electrical warning signal upon detecting that the carrier which supports the clutch mechanism and play-off reel has fallen to the lower end of the vertical member that slidingly supports the carrier.

BRIEF DESCRIPTION OF THE DRAWINGS

FIG. 2 is a side view of the slope monitoring device installed above the sloped wall of an open pit mine, dump, or the like.

FIG. 3 is an enlarged perspective view of the operative components of the slope monitoring device encircled by dashed line 3 within FIG. 2.

FIG. 4 is a perspective view of the operative components of the slope monitoring device supported upon a tripod and portable sled.

FIG. 5 is a sectional view of the clutch mechanism taken through lines 5—5, as shown in FIG. 3.

FIG. 6 is a view of the frictional clutch plate which engages the clutch pulley shown in FIG. 5.

FIG. 8 is a flow chart diagram indicating the steps performed by the microprocessor shown in FIG. 7 during operations of such slope monitoring device.

DETAILED DESCRIPTION OF THE PREFERRED EMBODIMENTS

Figure 1:
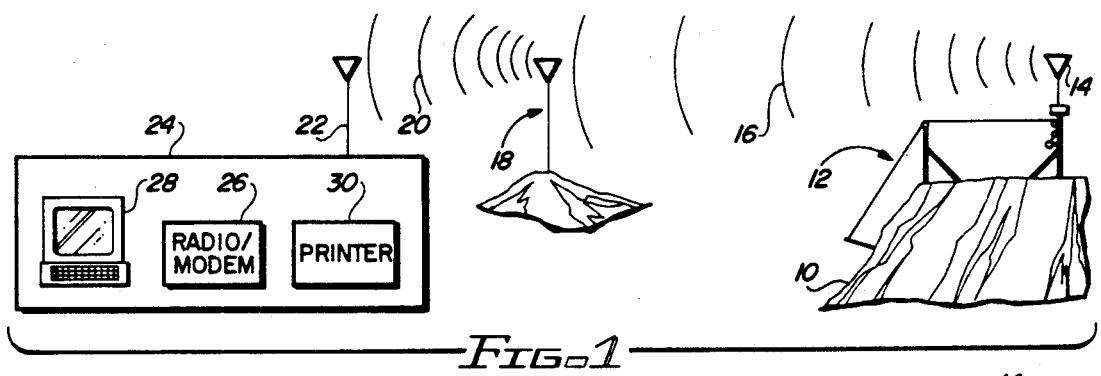
FIG. 1 is a simplified drawing showing the system overview of a system employing a slope monitoring device of the present invention.

Within FIG. 1, an overview of an open pit mining operation using a slope monitoring device constructed in accordance with the teachings of the present invention is shown. In FIG. 1, the sloped wall of a dump or pit is indicated by reference numeral 10. The slope monitoring device is designated generally by reference numeral 12 and is used to continuously monitor dump/wall subsidence via radio link to provide an additional factor of safety against slope failures. Within FIG. 1, antenna 14 of slope monitor device 12 transmits information by radio wave, indicated by reference numeral 16, to a repeater station 18, which amplifies and repeats radio wave 16 as radio wave 20. Radio wave 20 is received by antenna 22 of central mine office 24. Depending upon the strength of radio wave 16, and the distance between slope monitoring device 12 and central office 24, repeater 18 may be optional. In addition, while only one slope monitoring device 12 is shown in FIG. 1, those skilled in the art will appreciate that a number of such devices positioned in different portions of the mine may be coupled by radio link to central mine office 24.

Within central office 24, radio wave 20 is amplified and demodulated by radio/modem 26 to provide data transmitted by slope monitoring device 12, including data indicating the relative position of the extensometer cable. The data is then passed to a central computer 28 which processes the data for generating reports and/or alarms that can be displayed on the screen of computer 28 and/or printed out upon printer 30 within the central mine office. Such an alarm might be created, for example, when the central computer 28 notes, based upon present and past cable position measurements, that the movement of a particular sloped wall has exceeded a preset rate. Such a system is adapted to closely and accurately monitor and record slope movement, and to help predict slope failures. Moreover, such a system allows a mine operator to monitor the condition of a number of sloped walls in real time from a central location.

Figure 2:
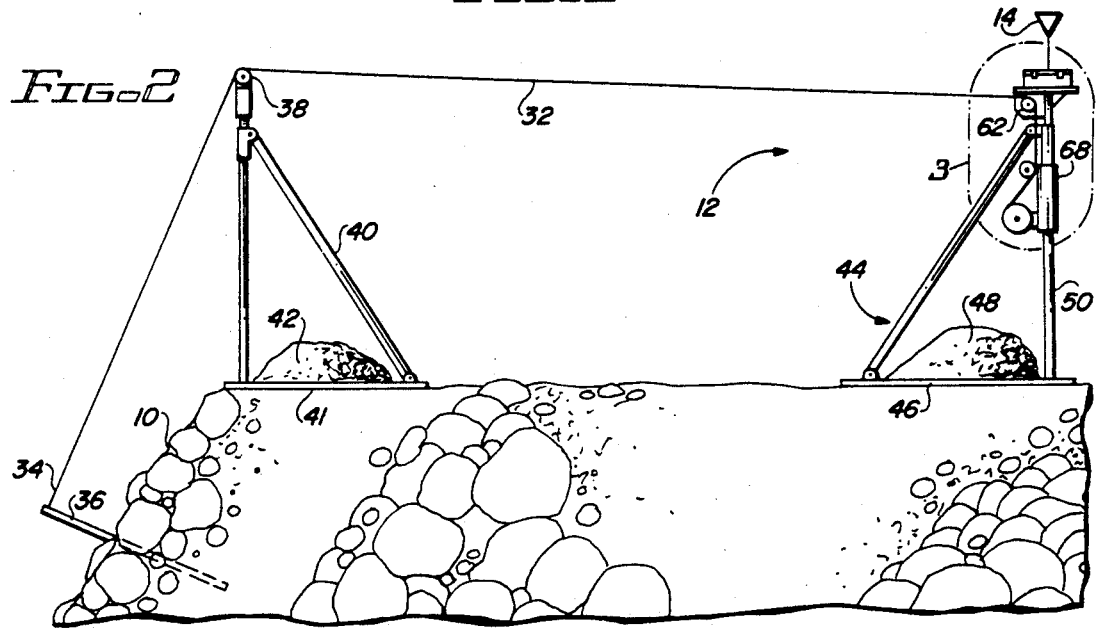

Referring to FIG. 2, slope monitoring device 12 includes a cable 32 having a first end 34 secured to a stake 36 anchored to the sloped wall 10 of the pit or dump. At the top of the sloped wall, cable 32 may be guided over an idler pulley 38 that is supported by a tripod 40. The legs of tripod 40 are secured at their lower ends to a flat base or sled 41 covered with ballast 42 to weight down the base and prevent tripod 40 from moving. Of course, should it be necessary to move slope monitoring device 12 to a different dump or pit, ballast 42 can easily be removed from base 41 to facilitate relocation.

Cable 32 continues from idler pulley 38 to another tripod assembly designated generally by reference numeral 44. Tripod assembly 44 may be spaced ten to 50 feet away from idler pulley 38. Like tripod 40, tripod assembly 44 includes a flat base or sled 46 upon which a ballast may be piled to weight down tripod assembly 44 and prevent movement thereof during use. The actual operation of the components mounted to tripod assembly 44 are described below in conjunction with FIGS. 3-6.

Referring to FIGS. 3 and 4, tripod assembly 44 includes a central mast or tubular leg 50 which extends substantially vertically from its lower end secured to base 46 up to its upper end secured to platform 51. A leg attachment bracket 54 is secured to central mast 50 proximate the upper end thereof, and a pair of tubular support legs 56 and 58 extend from bracket 54 downwardly toward opposite corners of base 46 to form a stable support for the remaining components of tripod assembly 44.

As shown in FIGS. 3 and 4, a control box 60 is supported upon platform 51 atop central mast 50. The contents and operation of control box 60 are described in greater detail below in conjunction with FIGS. 7 and 8. Also supported adjacent the upper end of central mast 50, and immediately below platform 51, is a cable movement detection pulley 62 over which cable 32 extends. Pulley 62 rotates whenever cable 32 moves. Pulley 62 is mounted upon the shaft 64 of an optical shaft encoder which generates a digital electrical encoded signal corresponding to the angular degree of rotation of shaft 64. Such an optical shaft encoder may be of the type commercially available from the Encoder Division of Litton Systems, Inc. under Model No. 76, or of the type commercially available from BEI Motion Systems Company, Chatsworth Encoder Division, of Chatsworth, Calif. under model number K25. The optical shaft encoder housing (not shown) is secured to the rear face of flange 66 extending downwardly from platform 51, and shaft 64 extends through a hole formed within flange 66.

Such optical shaft encoders typically employ a glass disk containing a code pattern printed thereon, as well as an array of light beams disposed on one side of the disk and directed at the patterned disk; a corresponding array of light sensors are disposed upon the opposing side of the patterned disk, and such light sensors detect either light or dark, depending upon the angular position of shaft 64. As the shaft is rotated, the coded pattern changes to produce a different digital code. For example, such optical shaft encoders can easily produce as many as 256 unique digital code patterns or more for each 360-degree rotation of shaft 64. Given the diameter of pulley 62, approximately three inches, cable movements of as little as one millimeter can easily be detected. Moreover, unlike potentiometers which are limited to 360 degrees of rotation or less, such optical shaft encoders may be rotated through unlimited numbers of full rotations and still be used to detect incremental movements of the cable.

Also shown in FIGS. 3 and 4 is a weighted sleeve or carrier 68 that is slidingly supported for vertical movement upon central mast 50. Secured to carrier 68 for movement therewith is a clutch mechanism 70 about which cable 32 is wrapped for one revolution. Also secured to carrier 68 is a cable play-off reel 72 about which the second end of cable 32 is wrapped. Clutch mechanism 70 serves to apply a frictional force to cable 32 for generally inhibiting free relative movement of cable 32 past clutch mechanism 70, while permitting additional lengths of cable 32 to be played off of reel 72, and past clutch mechanism 70 as tension in cable 32 increases beyond a selected tensional force due to movement of the sloped wall. Thus, the length of cable 32 extending between the first anchored end of cable 32 and clutch mechanism 70 is automatically increased when the tension in the cable exceeds a predetermined tensional force.

Weighted carrier 68, together with the weight of clutch mechanism 70 and reel 72, provide a means for applying a tensioning force to cable 32 for maintaining the cable under tension at all times. If, for example, cable 32 expands by one inch due to a rise in ambient temperature, carrier 68 will be pulled downward by gravity along central mast 50 by one inch to take up any slack in cable 32 and maintain cable 32 under tension. As mentioned above, clutch mechanism 70 applies a frictional force to cable 32 which inhibits slippage of cable 32 past clutch mechanism 70 unless the tensional force applied to cable 32 exceeds a selected tensional force. The combined weight of carrier 68, clutch mechanism 70, reel 72, and the cable wound upon reel 72, and hence the tensioning force applied to cable 32, is less than the selected tensional force required by clutch mechanism 70 to permit slippage of cable 32 past clutch mechanism 70. Thus, the weight alone of carrier 68 and the components supported thereby is insufficient to cause additional cable to be played off of reel 72.

As mentioned above, a leg attachment bracket 54 is secured to central mast 50 proximate the upper end thereof for joining thereto the upper ends of tripod legs 56 and 58. Leg attachment bracket 54 also serves as a stop to limit upward sliding movement of carrier 68 and clutch mechanism 70. Referring to FIG. 2, as first end 34 of cable 32 moves downhill due to movement of sloped wall 10, tension in cable 32 increases, pulling carrier 68, and hence clutch 70, upward along central mast 70. Continued movement of the cable ultimately raises carrier 68 to its fully raised position abutting bracket 54. Further downhill movement of first end 34 of cable 32 causes tension in cable 32 to increase until the tensional forces in the cable exceed the selected frictional force exerted upon the cable by clutch mechanism 70; in this event, clutch mechanism 70 allows just enough additional cable to be played off of reel 72, and to slip past clutch mechanism 70, to decrease the tension in cable 32. Should the tension in the cable later decrease, for example, due to higher ambient temperatures, carrier 68 will fall below bracket 54 to take up any slack in cable 32.

The structure and operation of clutch mechanism 70 are best understood by reference to FIGS. 5 and 6. Clutch mechanism 70 includes a cable pulley 74 supported for rotation upon the smooth, unthreaded upper portion of bolt 76. The opposing threaded end of bolt 76 is secured to a flange 78 extending from the upper portion of carrier 68, as by nuts 80 and 82. As shown in FIG. 5, cable 32 is wrapped completely around pulley 74 to provide good frictional engagement between cable 32 and pulley 74. If desired, such frictional engagement may be enhanced by knarling the cable-engaging surface of pulley 74, or by providing such pulley as a polygon-shaped member rather than a circle.

Pulley 74 includes a substantially planar circular face 84 that is engaged by a circular clutch pad 86 having a heat resistant frictional surface similar to that used in forming automotive disc brake pads. Clutch pad 86 includes a central aperture 88 for being supported upon the shaft of bolt 76. Clutch pad 86 is locked against rotation upon bolt 76, as by securing a smooth bore key shaft 90 thereto, and engaging key shaft 90 with a smooth aperture 92 formed in flange 78. Such an arrangement permits adjustment of the distance between clutch pad 86 and flange 78 while locking clutch pad 86 against rotation. As shown in FIG. 5, a compressible spring 94 is supported upon bolt 76 between clutch pad 86 and washer 96. Adjustment of nuts 80 and 82 allows the user to determine the compression force exerted by clutch pad 86 against circular face 84 of pulley 74. Thus, by adjusting nuts 80 and 82, the frictional force exerted upon cable 32 can be selected to a tensional force that exceeds the combined weight of carrier 68, clutch mechanism 70, reel 72, and the cable wound upon reel 72.

As described briefly above, control box 60 contains electronic components which allow slope monitor device 12 to communicate with a remote central office regarding detected movements of cable 32. The contents of control box 60 are shown in block diagram format within FIG. 7. Within FIG. 7, the optical shaft encoder is indicated by reference numeral 98 and is shown coupled to cable movement detection pulley 62 over which cable 32 extends.

A source of electrical power is required to operate the components within control box 60. Accordingly, control box 60 includes a rechargeable storage battery 100, which may be of the type commercially available from Gates Energy Products under the brand name "CYCLON", Model No. 0800-0047. If desired, an optional solar panel 102 may be mounted atop control box 60 for exposure to the sun in order to trickle-charge battery 100 during daylight hours, thereby extending the life of such battery. Such a solar panel may be a photovoltaic module of the type commercially available from Solarex Corporation of Rockville, Md, under product designation "MSX-18". If such a solar panel is used, then a conventional battery charger interface circuit (not shown) is provided to couple the output voltage of solar panel 102 to storage battery 100. However, initial tests have shown that such storage batteries will have a life of several months under normal use even in the absence of such solar panels, and accordingly, the use of such solar panels is considered optional. While not specifically shown within the block diagram of FIG. 7, it will be appreciated that the power supply voltage provided by battery 100 is electrically coupled to all electronic components requiring a power supply voltage.

As described above, the optical shaft encoder 98 generates an eight-bit digital code pattern corresponding to the angular orientation of pulley 62. This eight bit digital code pattern is coupled to the data input terminals of a microprocessor 104 over a multiple-conductor connecting cable (not shown) extending between control box 60 and optical shaft encoder 98. The same connector cable couples the power supply voltage from battery 100 to optical shaft encoder 98.

Microprocessor 104 is preferably of the type commercially available from Intel Corporation as Part No. 80C196. This microprocessor provides five eight-bit input/output data ports, includes onboard timers, and an onboard analog-to-digital converter. While this microprocessor ordinarily consumes relatively little power, further power savings may be achieved by entering a powerdown mode which temporarily halts operations until the powerdown mode is terminated. Further details concerning this microprocessor are set forth within the Intel Corporation Data Book published Oct. 1990, pages 4-98 through 4-104, the contents of which are hereby incorporated by reference.

Figure 7:
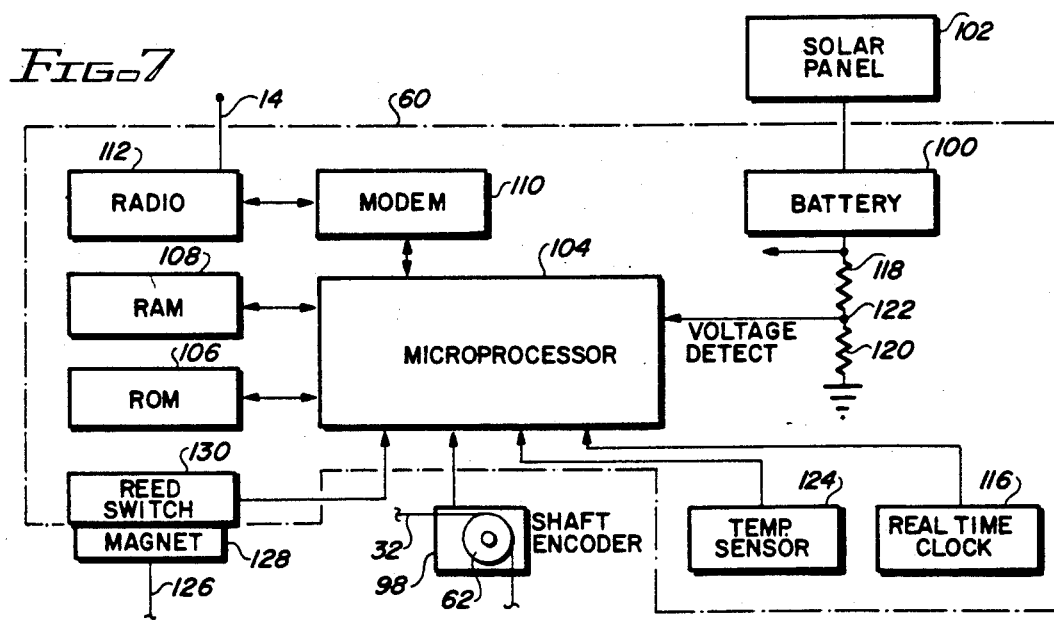
FIG. 7 is a block diagram of the electronic components contained within the slope monitoring device shown in FIG. 3.

As shown in FIG. 7, microprocessor 104 is also coupled to a Read Only Memory (ROM) 106 which is programmed to control the operations performed by microprocessor 104. While applicants are not setting forth herein the program code programmed within ROM 106, the program code may easily be written based upon the flow chart of operations performed as shown in FIG. 8 described in greater detail below. Microprocessor 104 is also coupled to Random Access Memory (RAM) 108 which serves to store data for later retrieval by microprocessor 104. Both ROM 106 and RAM 108 are coupled to the address bus of microprocessor 104 for being addressed thereby. Both ROM 106 and RAM 108 are coupled to one of the data ports of microprocessor 104 for exchanging data therewith.

As mentioned above, optical shaft encoder 98 is coupled to microprocessor 104 to provide an eight-bit digital signal thereto. Specifically, the eight output terminals of optical shaft encoder 98 are coupled to eight I/O data terminals of microprocessor 104 for providing thereto a digital representation of the current angular orientation of cable movement detector pulley 62.

Microprocessor 104 is coupled to a radio modem 110. This modem generates and/or detects two different audio tones depending upon whether the binary data being transmitted or received is a "1" or a "0", and is adapted to transmit and receive data at 1200 Baud. One such modem complying with such standard is that commercially available from Advanced Micro Devices under product designation "Am7910 FSK Modem". Microprocessor 104 controls the operation of modem 110, and determines, for example, whether modem 110 is to be transmitting or receiving. Microprocessor 104 also sends to modem 110, as a serial bit stream, the eight-bit digital optical shaft encoder output for transmission to a remote location, such as the central mine office. Ordinarily, modem 110 is directed by microprocessor 104 to receive. Only on those occasions when data is to be transmitted to the central mine office does microprocessor 104 direct modem 110 to transmit data.

Modem 110 is, in turn, coupled to radio transmitter/receiver 112 for transmitting a radio frequency modulated by the audio tones generated by modem 110, and for receiving corresponding modulated audio tones transmitted by radio frequency from the central mine office. Radio 112 may be of the type commercially available from TEKK Data Division of TEKK, Inc. of Kansas City, Mo. under product number "KS-900". This radio operates based upon a 9.6 volt power supply, and during the transmission mode, generates a frequency modulated output signal in the range of 450-470 MHz. of approximately 2 Watts.

Also shown in FIG. 7 is real time clock module 116 which may be of the type commercially available from Philips NVD under part number PCF8583. Real time clock module 116 supplies a signal to microprocessor 104 approximately every five seconds to awaken microprocessor 104 from its powerdown mode. Every five seconds, microprocessor 104 "wakes up" from its sleeping condition to poll its inputs in order to determine whether there is a need to transmit data to the central mine office. If not, microprocessor 104 "goes back to sleep" for another five seconds until the next wake-up signal is received. By counting the number of wake-up signals received from real time clock module 116, microprocessor 104 can determine when ten minutes has elapsed since its last radio transmission of data. If ten minutes has elapsed since its last transmission, then microprocessor 104 will initiate a radio transmission sequence even though none of the data inputs thereto have changed their condition.

As described above, storage battery 100 may be expected to have a life of several months before being fully discharged. Nonetheless, it is helpful to the mine operator to be able to monitor the storage battery voltage to determine when the time is approaching when the battery will need to be replaced or recharged. For this purpose, battery 100 is coupled through a resistive divider network, including resistors 118 and 120, to ground potential, and the node 122 joining resistors 118 and 120 is coupled to one of the analog input terminals of microprocessor 104. Microprocessor 104 includes an onboard analog-to-digital converter which is used to convert the voltage at node 122 to an eight-bit digital representation of the voltage at node 122. This digital value is transmitted by modem 110 and radio 112 to the central mine office each time the optical shaft encoder value is transmitted for allowing the central mine office to remotely monitor the storage battery voltage.

Another aspect of the present invention relates to the ability to sense the ambient temperature for purposes of correcting cable movement data that might actually be attributable to expansion or contraction of the cable rather than actual wall movement. To facilitate this objective, temperature sensor 124 is also included within control box 60. Temperature sensor 124 may be of the type commercially available from National Semiconductor Corporation under product number "LM135". This temperature sensor produces an analog output voltage which varies linearly with ambient temperature. The output of temperature sensor 124 is coupled to one of the analog input terminals of microprocessor 104 for conversion to an eight-bit digital signal proportional to ambient temperature. This digital value is transmitted by modem 110 and radio 112 to the central mine office each time the optical shaft encoder value is transmitted for allowing the central mine office to remotely monitor the ambient temperature, and to make any necessary adjustments to the cable position information resulting from changes in temperature.

Another condition which may require notification of the central mine office relates to a loss of tension on cable 32. Such a loss of tension may arise, for example, if the cable were to break. Similarly, tension would be lost either if the clutch mechanism were to fail, or if all of the stored cable wound about reel 72 were played off of the reel due to significant slope movement over time. In any of such situations, carrier 68 will fall to the lower end of central mast 50. Referring to FIG. 3, a flexible cord 126 is secured at its lower end to carrier 68. The upper end of cord 126 is secured to a magnet 128. Cord 126 and magnet 128 are also shown schematically within FIG. 7. Magnet 128 is initially placed over a designated window of control box 160 proximate a reed switch 130 shown schematically in FIG. 7. Reed switch 130 is closed so long as magnet 128 is proximate thereto. However, should magnet 128 be removed from the vicinity of reed switch 130, then reed switch 130 opens. Cord 126 is selected to be of such length that magnet 128 is pulled away from control box 60 when carrier 68 falls to a position near the bottom of central mast 50. Reed switch 130 may be coupled between ground potential and a pull-up resistor (not shown) to produce a voltage that is normally at ground potential when reed switch 130 is closed, but which rises toward the power supply voltage when reed switch 130 opens. This voltage is coupled to microprocessor 104 as a binary input signal that is noted by microprocessor 104 each time it "awakens". If the reed switch indicates a malfunction of the cable, then microprocessor 104 immediately initiates a radio transmission cycle to alert the central mine office of the failure.

The sequence of operations performed by microprocessor 104 will now be described in greater detail in conjunction with the flow chart shown in FIG. 8. Starting point 132 designates initial power startup of the components within control box 60 following installation of slope monitoring device 12. A first step performed by microprocessor 104 is to reset a ten minute counter, as designated by box 134. As explained above, the ten minute counter is used to count the number of wake-up signals received from real time clock 116. Since such wake-up signals are generated approximately every five seconds, the ten minute counter will increment up to a value of 120. Upon reaching a count of 120, microprocessor 104 recognizes that ten minutes has elapsed since its last radio transmission. Following each radio transmission, the ten minute counter is reset, as indicted by box 147 described below.

After resetting the ten minute counter at step 134, microprocessor 104 notes the present value of optical shaft encoder 98 and stores such value for future reference, as designated by box 136 in FIG. 8. At this point, microprocessor 104 is powered-down into its "sleeping" mode to conserve power until receiving the next wake-up call from real time clock 116. This powered-down operation is designated within the flow chart of FIG. 8 by decision box 138.

Once microprocessor 104 is awakened by real time clock 116, it first notes the current encoder value provided by optical shaft encoder 98, as indicated by box 140. It then compares such value with the prior value stored at step 136 to determine if the encoder value has changed, as indicated by decision box 142. If the encoder value has changed, the program sequence proceeds directly to box 144 for initiating a radio transmission cycle of the current optical shaft encoder value, ambient temperature, battery voltage value, and reed switch condition. In addition, since more than one slope monitor device 12 may be used in a mine, the radio transmission cycle also includes an identification bit stream of eight bits serving to identify which of the slope monitoring devices has initiated the transmission. Thus as many as 256 individual slope monitoring devices can all share a single radio channel to communicate with the central mine office. Finally, microprocessor 104 computes a checksum that is also transmitted by modem 110 and radio 112 to allow the central mine office to verify that no errors have occurred during transmission. After transmitting such information, microprocessor 104 proceeds to step 146 to determine whether the central mine office has acknowledged receipt of such transmission. In order to implement such step, microprocessor 104 causes modem 110 and radio 112 to switch from transmission mode back to the receiving mode and awaits receipt of a signal from the central mine office confirming receipt of the transmission. If such acknowledgement signal is not received within a predetermined time, for example, one second, following such transmission, microprocessor 104 returns to step 144 and repeats such transmission until receiving the proper acknowledgement signal from the central mine office. After receiving such acknowledgement signal, program control passes to box 147 to reset the ten minute counter; thereafter, program control returns to step 138 for power-down.

Returning to decision box 142 of FIG. 8, if microprocessor 104 determines that the optical shaft encoder value has not changed, then microprocessor 104 proceeds to step 148 for noting the 8 bit digital value provided by the analog-to-digital convertor on board microprocessor 104 based upon the voltage at node 122. This 8 bit digital value is then compared to a previously stored digital value representing the lowest safe working battery voltage, as indicated by decision box 150. If such comparison indicates that the battery voltage is low, then program flows directed to step 144 described above to initiate a radio transmission cycle. On the other hand, if the battery voltage is within safe working limits, program flow is directed to box 152 for noting the status of reed switch 130. If reed switch 130 is open, indicating a problem with cable 32, program flow is then directed to box 144 for initiating a radio transmission cycle to warn of the problem, as indicated by decision box 154. Assuming, however, that reed switch 130 remains closed, program flow then proceeds to decision box 158 to determine whether the aforementioned ten minute counter has yet been incremented to a count of 120. If not, program flow is returned to decision box 138 to await the next wake-up call from real time clock 116.

Those skilled in the art will now appreciate that a slope monitoring device has been described which allows a central mine office to remotely monitor the condition of a sloped wall within an open pit mine or dump, thereby avoiding the need for frequent on-site inspections by a mine employee. The described device can operate with extended periods without requiring manual intervention, provides ambient temperature data, and signals the central mine office when maintenance is required. The described device is highly portable, relatively inexpensive to manufacture, easy to install, and adapted to operate in harsh mining environments.

While the present invention has been described with a preferred embodiment thereof, the description is for illustrative purposes only and should not be construed as limiting the scope of the invention. Various changes and modifications may be made by those skilled in the art without departing from the true spirit and scope of the invention as defined by the appended claims.

We claim:

1. A slope monitoring device for detecting movement of a sloped wall, said device comprising in combination:
   a. a cable having first and second opposing ends;
   b. anchor means for securing the first end of the cable to the sloped wall that is to be monitored;
   c. detector means operatively engaged with said cable at a point disposed between the first and second ends of said cable for detecting movement of said cable; and
   d. clutch means engaged with said cable between the first and second ends of said cable, said clutch means applying a frictional force to said cable for generally inhibiting free relative movement of said cable past said clutch means, said clutch means permitting the length of said cable extending between the first end of said cable and said clutch means to be increased as tension in said cable increases beyond a selected tensional force due to movement of the sloped wall.

2. The slope monitoring device recited by claim 1 including tensioning means operatively engaged with said cable for applying a tensioning force to said cable for maintaining said cable under tension.

3. The slope monitoring device recited by claim 2 wherein the tensioning force applied to said cable by said tensioning means is less than the selected tensional force required by said clutch means to permit movement of said cable past said clutch means.

4. The slope monitoring device recited by claim 2 wherein said tensioning means includes a substantially vertical member and a carrier slidingly coupled to said vertical member for movement therealong, said clutch means being secured to said carrier for movement therewith, the weight of said clutch means and carrier applying said tensioning force to said cable.

5. The slope monitoring device recited by claim 4 further including a reel for storing a portion of said cable lying between said clutch means and the second end of said cable.

6. The slope monitoring device recited by claim 5 wherein said reel is mounted to said carrier for sliding movement with said clutch means.

7. The slope monitoring device recited by claim 4 wherein said substantially vertical member includes an upper end, and wherein said slope monitoring device further includes a stop proximate the upper end of said substantially vertical member to limit upward sliding movement of said clutch means.

8. The slope monitoring device recited by claim 1 wherein said anchor means is a stake anchored to the sloped wall.

9. The slope monitoring device recited by claim 1 further including a reel for storing a portion of said cable lying between said clutch means and the second end of said cable.

10. The slope monitoring device recited by claim 1 wherein said detector means includes a pulley about which said cable is rotatably supported, said detector means sensing angular rotation of said pulley to detect movement of said cable.

11. The slope monitoring device recited by claim 10 wherein said detector means includes a battery for providing a source of electrical power and an electronic position encoder coupled to said pulley and electrically coupled to said battery for generating an electrical signal representative of the angular position of said pulley.

12. The slope monitoring device recited by claim 11 wherein said electronic position encoder is an optical shaft encoder for generating a digital signal corresponding to the relative angular degree of rotation of said pulley.

13. The slope monitoring device recited by claim 11 wherein said detector means includes a radio for transmitting to a remote location the electrical signal representative of the angular position of said pulley.

14. The slope monitoring device recited by claim 13 wherein said detector means periodically compares the current angular position of said pulley to a past angular position of said pulley, said detector means causing said radio to transmit the electrical signal representative of the current angular position of said pulley if the current angular position of said pulley differs from the past angular position of said pulley by a predetermined amount.

15. The slope monitoring device recited by claim 13 wherein said detector means further includes a temperature sensor for generating an electrical signal corresponding to the ambient temperature in proximity to said slope monitoring device, and wherein said radio transmits to a remote location the electrical signal corresponding to the ambient temperature in proximity to said slope monitoring device.

16. The slope monitoring device recited by claim 13 wherein said detector means further includes a sensor for detecting that said clutch means is no longer engaged with said cable and for generating an electrical warning signal in response thereto, and wherein said radio transmits to a remote location the electrical warning signal.

17. The slope monitoring device recited by claim 16 including tensioning means operatively engaged with said cable for applying a tensioning force to said cable for maintaining said cable under tension, said tensioning means including a substantially vertical member having opposing upper and lower ends and a carrier slidingly coupled to said vertical member for movement therealong, said clutch means being secured to said carrier for movement therewith, the weight of said clutch means and carrier applying said tensioning force to said cable, and wherein said sensor includes means for sensing that said carrier is proximate the lower end of said vertical member.

18. The slope monitoring device recited by claim 13 wherein said detector means includes voltage detecting means for generating an electrical signal representative of the voltage of said battery, and wherein said radio transmits to a remote location the electrical signal representative of the voltage of said battery.

* * * * *